(12) United States Patent
Kim et al.

(10) Patent No.: US 7,961,287 B2
(45) Date of Patent: Jun. 14, 2011

(54) LIQUID CRYSTAL DISPLAY DEVICE HAVING SPACERS OVERLAPPED WITH SLITS IN THE COMMON LINE AND GATE LINE

(75) Inventors: Jong Woo Kim, Paju-si (KR); Won Hyung Yoo, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 12/457,590

(22) Filed: Jun. 16, 2009

(65) Prior Publication Data

US 2009/0258451 A1    Oct. 15, 2009

Related U.S. Application Data

(62) Division of application No. 11/267,265, filed on Nov. 7, 2005, now Pat. No. 7,557,892.

(30) Foreign Application Priority Data

Dec. 30, 2004  (KR) .................. 10-2004-0116284

(51) Int. Cl.
*G02F 1/1339* (2006.01)
*G02F 1/1343* (2006.01)

(52) U.S. Cl. ......... 349/155; 349/141; 349/156; 349/157

(58) Field of Classification Search .................. 349/141, 349/155–157

See application file for complete search history.

(56) References Cited

U.S. PATENT DOCUMENTS

| | | | |
|---|---|---|---|
| 5,622,814 A | 4/1997 | Miyata et al. | |
| 6,091,473 A | 7/2000 | Hebiguchi | |
| 6,172,728 B1 | 1/2001 | Hiraishi | |
| 6,805,308 B2 | 10/2004 | Kweon et al. | |
| 6,897,935 B2 | 5/2005 | Matsumoto et al. | |
| 7,046,327 B2 | 5/2006 | Okamoto et al. | |
| 7,133,103 B2 | 11/2006 | Park et al. | |
| 7,133,108 B2 | 11/2006 | Shimizu et al. | |
| 2004/0046922 A1 | 3/2004 | Yanagawa et al. | |
| 2004/0233378 A1* | 11/2004 | Okamoto et al. | 349/156 |
| 2005/0046779 A1 | 3/2005 | Sumi et al. | |
| 2005/0140914 A1 | 6/2005 | Sawasaki et al. | |

FOREIGN PATENT DOCUMENTS

| | | |
|---|---|---|
| JP | 2004-046123 | 2/2004 |
| KR | 1020040101087 A | 12/2004 |

* cited by examiner

*Primary Examiner* — David Nelms
*Assistant Examiner* — Lauren Nguyen
(74) *Attorney, Agent, or Firm* — McKenna Long & Aldridge LLP

(57) ABSTRACT

An LCD device is disclosed in which column spacers for a cell gap are arranged between gate and common lines to reduce a contact area between the column spacers and an opposing substrate, and a stable cell gap is maintained over the whole panel by reducing variation of a thickness per area of a thin film transistor (TFT) substrate corresponding to the column spacers. The LCD device includes first and second substrates facing each other, gate and data lines formed on the first substrate to cross each other, and pixel regions, a thin film transistor formed in each portion where the gate and data lines cross, common and pixel electrodes alternately formed in the pixel regions, common lines formed adjacent to the gate lines substantially parallel to the gate lines, a first column spacer formed on the second substrate corresponding to a portion between the gate line and the common line, and a liquid crystal layer filled between the first and second substrates.

12 Claims, 16 Drawing Sheets

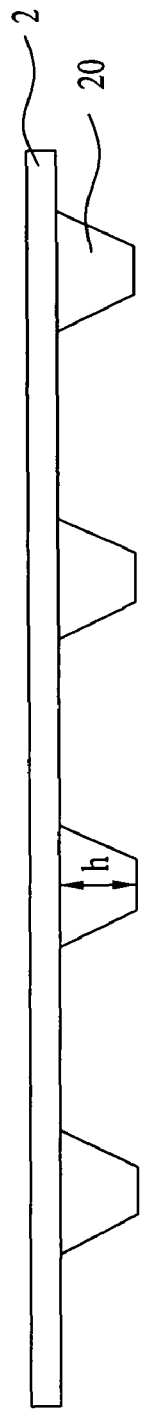
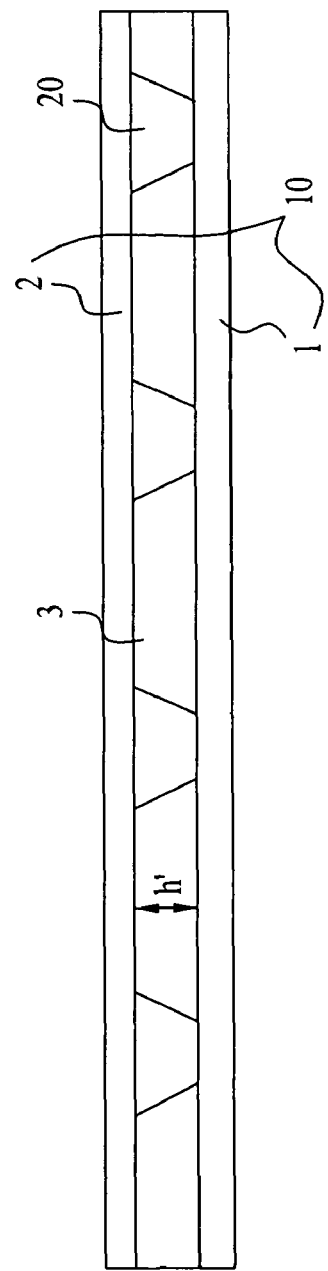
FIG. 2A
Related Art
FIG. 2B
Related Art

US 7,961,287 B2

LIQUID CRYSTAL DISPLAY DEVICE HAVING SPACERS OVERLAPPED WITH SLITS IN THE COMMON LINE AND GATE LINE

This application is a divisional of U.S. patent application Ser. No. 11/267,265, filed Nov. 7, 2005 now U.S. Pat. No. 7,557,892, which claims the benefit of the Korean Patent Application No. 10-2004-116284, filed on Dec. 30, 2004, which is hereby incorporated by reference for all purposes as if fully set forth herein.

BACKGROUND OF THE INVENTION

1. Field of the Invention

The present invention relates to a liquid crystal display (LCD) device, and more particularly, to an LCD device in which column spacers for a cell gap are arranged between gate and common lines to reduce a contact area between the column spacers and an opposing substrate, and a stable cell gap is maintained over the whole panel by reducing variation of a thickness per area of a thin film transistor (TFT) substrate corresponding to the column spacers.

2. Discussion of the Related Art

A related art LCD device will be described with reference to the accompanying drawings.

FIG. 1 is an exploded perspective view illustrating a related art LCD device.

As shown in FIG. 1, the related art LCD device includes a first substrate 1, a second substrate 2, and a liquid crystal layer 3 formed between the first and second substrates 1 and 2 by injection.

In more detail, the first substrate 1 includes a plurality of gate lines 4 arranged along a first direction at fixed intervals, and a plurality of data lines 5 arranged along a second direction perpendicular to the first direction at fixed intervals. A plurality of pixel electrodes 6 are arranged in a matrix-type configuration within pixel regions P defined by crossing the gate and data lines 4 and 5. The first substrate 1 also includes a plurality of TFTs T formed at respective areas where the gate lines 4 cross the data lines 5 to transmit data signals from the data lines to the respective pixel electrodes according to gate pulse signals supplied to the gate lines.

Also, the second substrate 2 includes a black matrix layer 7 that blocks light from portions of the first substrate 1 except the pixel regions P, an R/G/B color filter layer 8 for displaying various colors, and a common electrode 9 for producing the image on the color filter layer 8.

In the aforementioned LCD device, the liquid crystal layer 3 is aligned by an electric field generated between the pixel electrode 6 and the common electrode 9. Light irradiated through the liquid crystal layer 3 may be controlled by the alignment direction of the liquid crystal layer 3, thereby displaying the image.

This kind of LCD device is referred to as a twisted nematic (TN) mode LCD device, which has disadvantageous characteristics such as a narrow viewing angle. In order to overcome the narrow viewing angle, an In-Plane switching (IPS) mode LCD device has been actively developed.

In the IPS mode LCD device, a pixel electrode and a common electrode are formed in a pixel region parallel to each other at a fixed interval therebetween, an electric field parallel to the substrates develops between the pixel electrode and the common electrode, thereby aligning the liquid crystal layer according to the electric field parallel to the substrates.

Meanwhile, a method of manufacturing a related art LCD device is classified into a liquid crystal injection method and a liquid crystal dispensing method depending upon a method of forming a liquid crystal layer between a first substrate and a second substrate.

First, the method of manufacturing the LCD device according to the liquid crystal injection method will be described as follows.

An LCD panel and a container having liquid crystal material therein are provided in a chamber, and the chamber is evacuated. Moisture and air bubbles in the liquid crystal material and the container are simultaneously removed, and an inside space of the LCD panel is maintained in a vacuum state.

Then, an injection inlet of the LCD panel is dipped into the container having the liquid crystal material in the vacuum state, and the vacuum state inside the chamber is brought to atmospheric pressure. Thus, the liquid crystal material is injected into the LCD panel through the injection inlet by a pressure difference between the inside of the LCD panel and the chamber.

However, the method of manufacturing the LCD device by the liquid crystal injection method has the following disadvantages.

First, after cutting a large sized glass substrate into the respective LCD panel regions, the injection inlet is dipped into the container having the liquid crystal material while maintaining the vacuum state between the two substrates. The process of injecting liquid crystal material between the two substrates is slow thereby lowering yield.

Also in the case of forming a large sized LCD device, it is difficult to completely inject the liquid crystal material into the inside of the LCD panel, thereby causing failure due to incomplete injection of the liquid crystal material.

Furthermore, the process of the liquid crystal material is slow and a large space is required for the liquid crystal injection device.

In order to overcome the problems with the liquid crystal injection method, the liquid crystal dispensing method has been developed. In the dispensing method, two substrates are bonded to each other after dispensing liquid crystal material on any one of the two substrates.

In this method, it is impossible to use ball spacers for maintaining a cell gap between the two substrates since the ball spacers move in the spreading direction of liquid crystal material.

Thus, instead of the ball spacers, patterned spacers or column spacers are fixed to any one of the two substrates to maintain the cell gap between the two substrates.

FIG. 2A is a structural sectional view illustrating a color filter substrate provided with column spacers, and FIG. 2B is a structural sectional view illustrating the state when a TFT substrate is bonded to the color filter substrate.

As shown in FIG. 2A, the column spacers 20 are formed on a black matrix layer (not shown) of the color filter substrate 2. In this case, each of the column spacers 20 has a height "h".

As shown in FIG. 2B, if the color filter substrate 2 provided with the column spacers 20 is arranged to oppose the TFT substrate 1 and is bonded to the TFT substrate 1, the column spacers 20 are contracted at a height "h'" representing a height of a cell gap due to pressure generated when bonding the substrates together.

As shown in FIG. 2A and FIG. 2B, the column spacers 20 within a panel 10 bonding the substrates together are pressed at a thickness h-h' according to the pressure during bonding and contracted at the height "h'" of the cell gap.

As described above, the LCD device including the column spacers has a relatively large contact area with an opposing substrate (TFT substrate) unlike the ball spacers, thereby causing a great frictional force due to the increase in the contact area to the substrate. Accordingly, in a case where the screen of the LCD device having the column spacers is rubbed, spots may be generated on the screen for a long time.

FIG. 3A and FIG. 3B are a plan view and a cross-sectional view illustrating the spots generated on the screen by touching the LCD panel.

As shown in FIG. 3A, if the LCD panel 10 is continuously touched with a finger or pen along a predetermined direction, the second substrate 1 of the LCD panel 10 is shifted at a predetermined interval along the touched direction as shown in FIG. 3B. At this time, the second substrate 1 is not restored to the original state for a long time. In this case, liquid crystal molecules 3 touched with a finger or pen are dispersed and the liquid crystal molecules 3 are gathered in the region around the touch portion. For this reason, a cell gap h1 corresponding to the region where the liquid crystal molecules are gathered is higher than a cell gap h2 of the remaining portions, thereby generating a touch defect that represents spots around the touch portion due to surplus and shortage of the liquid crystal molecules.

The touch defect is generated in the LCD device provided with the column spacers because the column spacers are fixed to one substrate and are in contact with another opposing substrate in a surface type to form a relatively large contact area unlike the globular ball spacers.

Consequently, the aforementioned related art LCD device has the following disadvantages.

First, in the related art LCD device provided with the column spacers, when the LCD panel is touched while being pressed in a predetermined direction, the substrates shifted in opposing directions are not restored to the original state or it takes a long time even if they are restored to the original state. For this reason, light leakage occurs in a portion where the liquid crystal molecules are pushed from the touch portion during a restoring time. It is noted that such a touch defect is caused by the frictional force generated by a large contact area between the column spacers and their opposing substrate.

Second, the ball spacers are dispersed for injection of the liquid crystal and have a globular form. When a predetermined area of the panel is pressed, the ball spacers corresponding to the predetermined area of the panel are slid and have tolerance to the pressed pressure. However, since the column spacers are selectively in portions except for the pixel region, the column spacers may easily be deformed when the portion having no column spacers is pressed. A structure below the column spacers may be broken.

Third, a height difference occurs in the column spacers due to a gap between the column spacers. In this case, the contact area and the contact pressure between the column spacers and the opposing substrate are varied, thereby generating a defect of a cell gap over the whole panel.

Such a problem seriously occurs in large sized LCD panel based on the liquid crystal dispensing method in forming the liquid crystal layer of the LCD panel. This is caused by difficulty in selecting a proper amount of the liquid crystal dispensed on the substrate unlike the liquid crystal dispensing method in which the liquid crystal is injected into the substrate by the pressure difference between the inside of the LCD panel and the outside thereof.

SUMMARY OF THE INVENTION

Accordingly, the present invention is directed to an LCD device that substantially obviates one or more problems due to limitations and disadvantages of the related art.

An advantage of the present invention is to provide an LCD device in which column spacers for a cell gap are arranged between gate and data lines to reduce a contact area between the column spacers and an opposing substrate and a stable cell gap is maintained over the whole panel by reducing variation of a thickness per area of a thin film transistor (TFT) substrate corresponding to the column spacers.

Additional advantages, and features of the invention will be set forth in part in the description which follows and in part will become apparent to those having ordinary skill in the art upon examination of the following or may be learned from practice of the invention. The advantages of the invention may be realized and attained by the structure particularly pointed out in the written description and claims hereof as well as the appended drawings.

To achieve these and other advantages and in accordance with the purpose of the invention, as embodied and broadly described herein, an LCD device according to the present invention includes first and second substrates facing each other; gate and data lines formed on the first substrate to cross each other, thereby defining pixel regions; a thin film transistor (TFT) formed in each portion where the gate lines cross the data lines; common lines formed adjacent to the gate lines; at least one common electrode extended from the common line and at least one pixel electrode connected to a drain electrode of the thin film transistor in each of the pixel regions; a plurality of first column spacers, each formed on the second substrate corresponding to a portion between the gate line and the common line; and a liquid crystal layer filled between the first and second substrates.

The first column spacer corresponds to a recessed portion between the gate and common lines.

The first column spacer is overlapped with the gate line. The LCD device further includes a gate slit formed in the gate line overlapped with the first column spacer.

The first column spacer is overlapped with the common line. The LCD device further includes a common slit formed in the common line overlapped with the first column spacer.

The first column spacer is overlapped with both the gate line and the common line. The LCD device further includes at least one slit in the common and gate lines overlapped with the first column spacer.

The LCD device further includes a second column spacer formed on the second substrate to correspond to a predetermined portion of the gate line. The second column spacer is not in contact with the first substrate. The second column spacer is spaced apart from the uppermost surface of the first substrate at an interval of 0.2 μm to 0.6 μm when the first substrate is bonded to the second substrate.

The LCD device further includes a black matrix layer formed on the second substrate to shield portions except for pixel regions and the TFT, and an R/G/B color filter layer formed to correspond to the pixel regions. The LCD device further includes an overcoat layer formed on an entire surface of the second substrate including the black matrix layer and the color filter layer.

The gate and common lines are formed on one layer.

The LCD device further includes a gate insulating layer interposed between the layer of the gate and common lines and a layer of the data line.

The LCD device further includes a passivation film interposed between the layer of the data line and a layer of the pixel electrode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2A is a structural sectional view illustrating a color filter substrate provided with column spacers;

FIG. 2B is a structural sectional view illustrating the state that a TFT substrate is bonded to the color filter substrate;

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

If an LCD panel provided with column spacers is touched with a finger or pen along a predetermined direction, a substrate of the LCD panel is shifted at a predetermined interval along the touched direction. Since it takes a long time to restore the substrate to the original state, a touch defect that represents spots around the touch portion occurs for a time to restore the substrate to the original state. The touch defect is caused by a frictional force generated due to a large contact area between the column spacers and their opposing substrate. Therefore, to remove the touch defect, efforts to reduce the contact area have been performed. One of the efforts is an LCD device having an extension.

Figure 1:
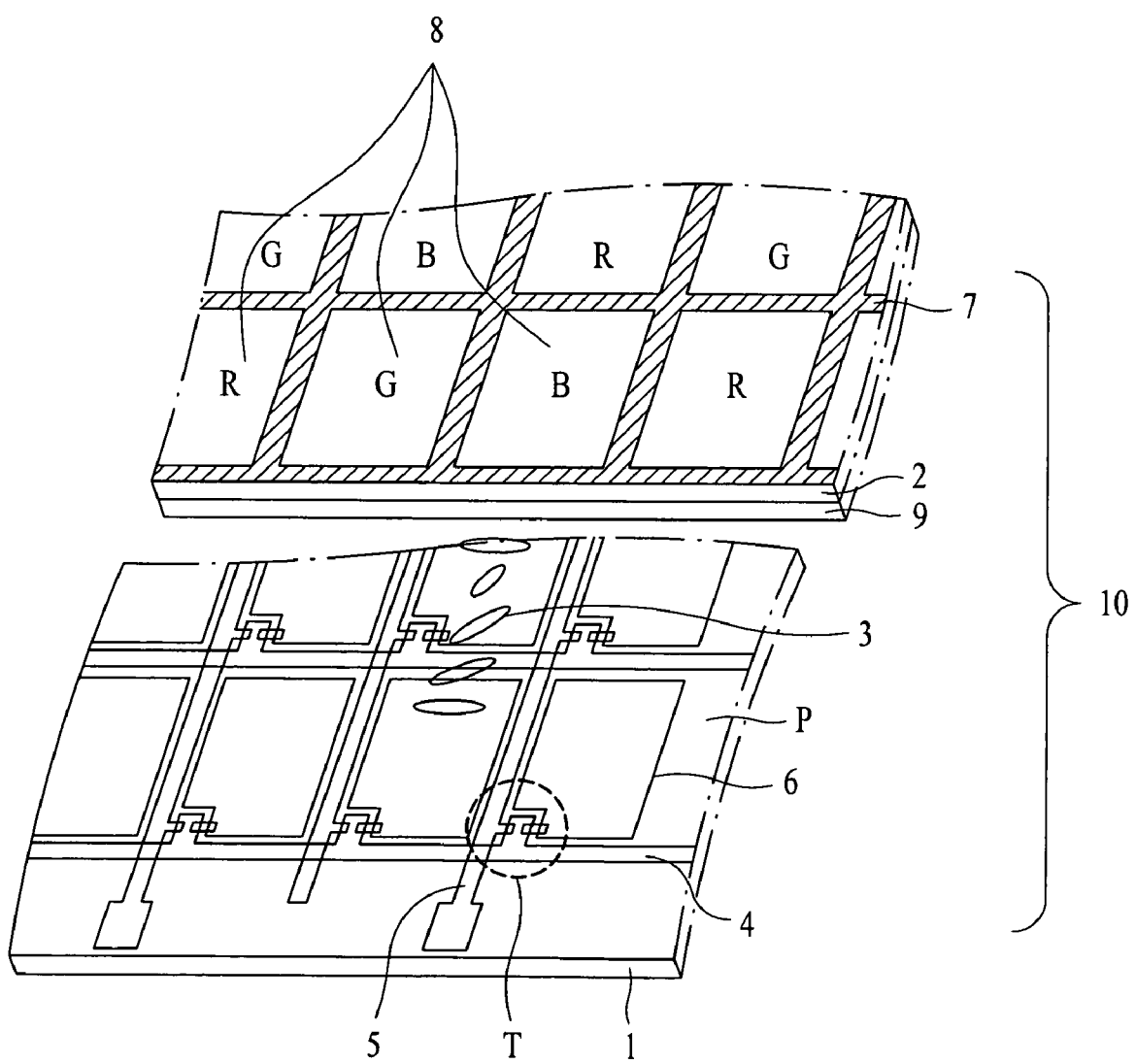
FIG. 1 is an exploded perspective view illustrating a related art LCD device.
Figure 3A:
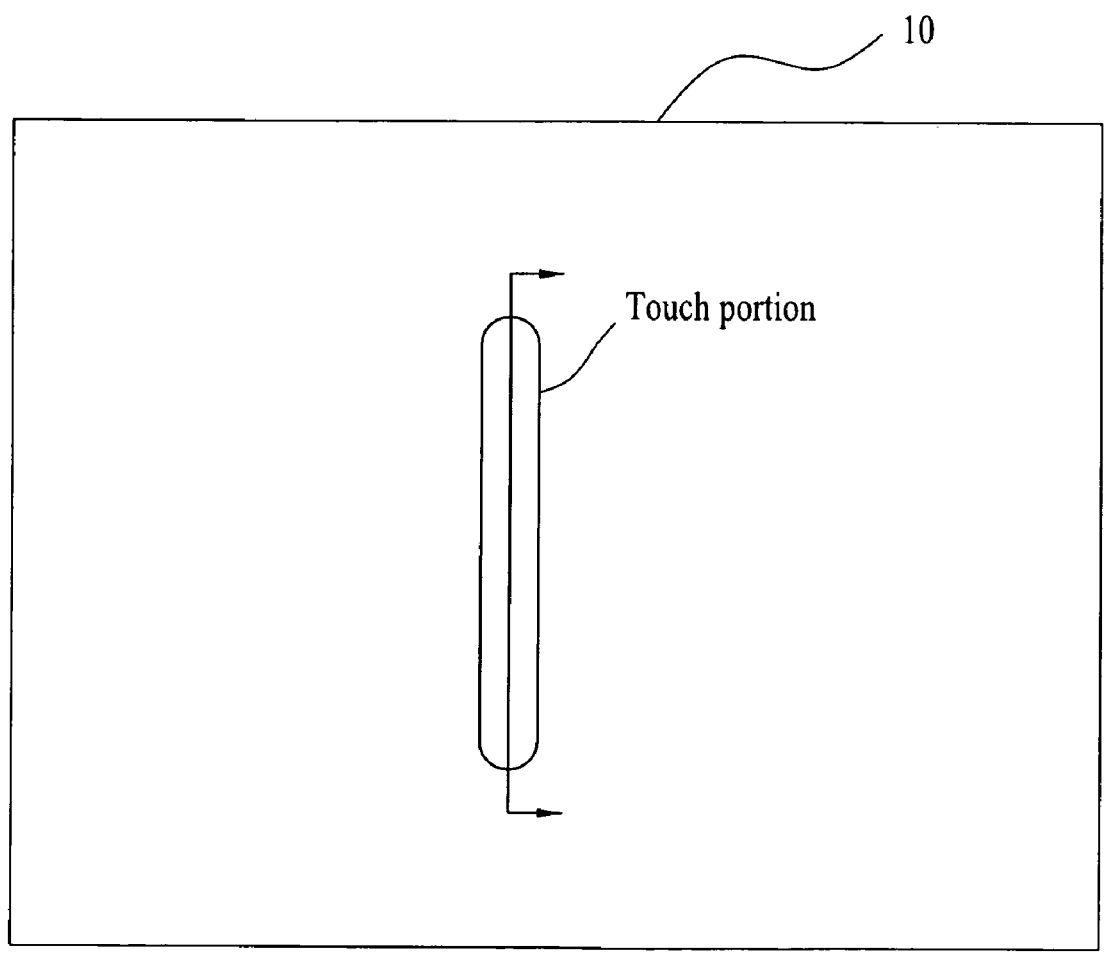
FIG. 3A and FIG. 3B are a plan view and a cross-sectional view illustrating spots generated on the screen by touching an LCD panel.
Figure 3B:
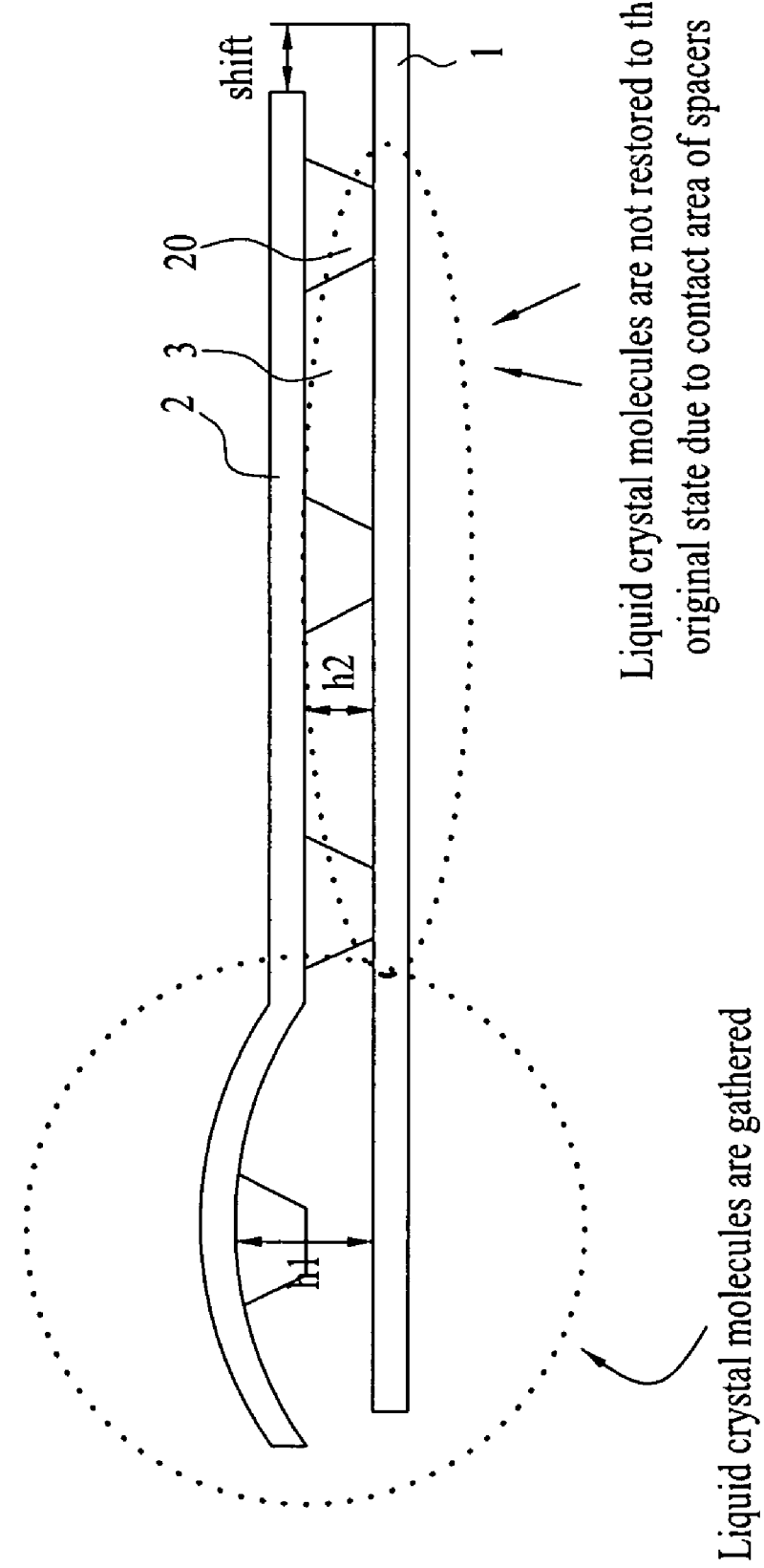
Figure 4:
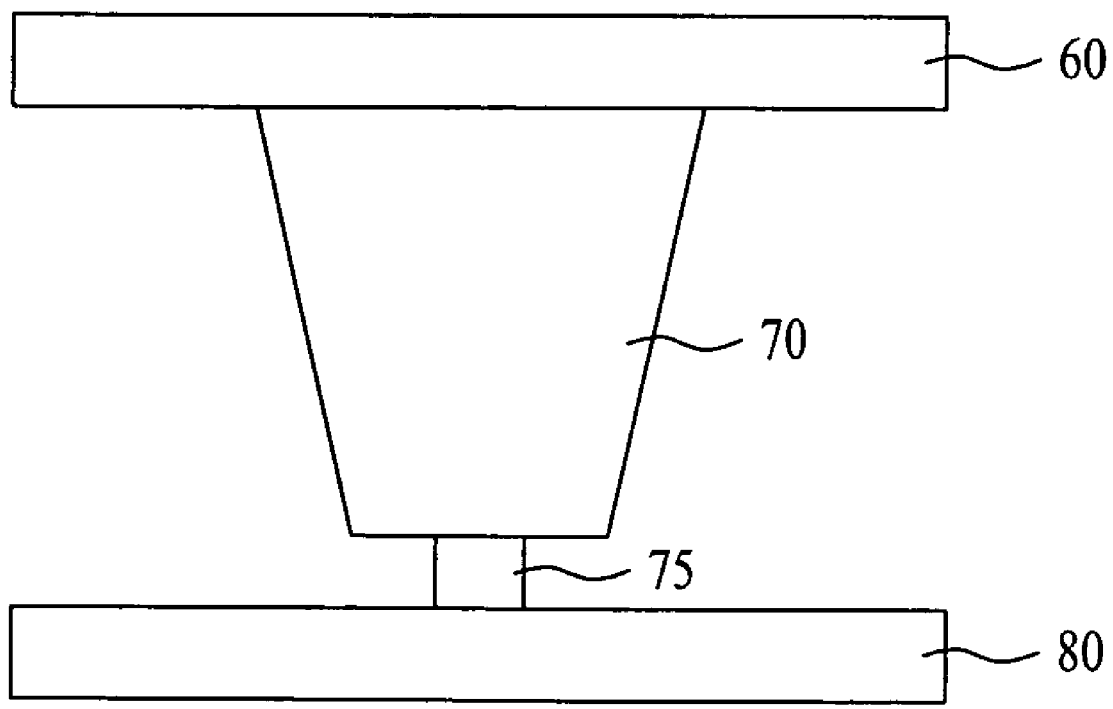
FIG. 4 is a sectional view illustrating a structure of an extension according to the present invention.

FIG. 4 is a sectional view illustrating a structure of an extension according to the present invention.

In FIG. 4, a column spacer 70 is formed on a first substrate 60 and an extension 75 is formed on a second substrate 80, so that a contact area between the column spacer 70 and the second substrate 80 can be reduced.

The extension 75 serves to reduce a frictional force between the column spacer and its opposing substrate by reducing a large contact area between the column spacer and the opposing substrate considering that a touch defect occurs due to the contact area, thereby preventing the touch defect from occurring.

Figure 5:
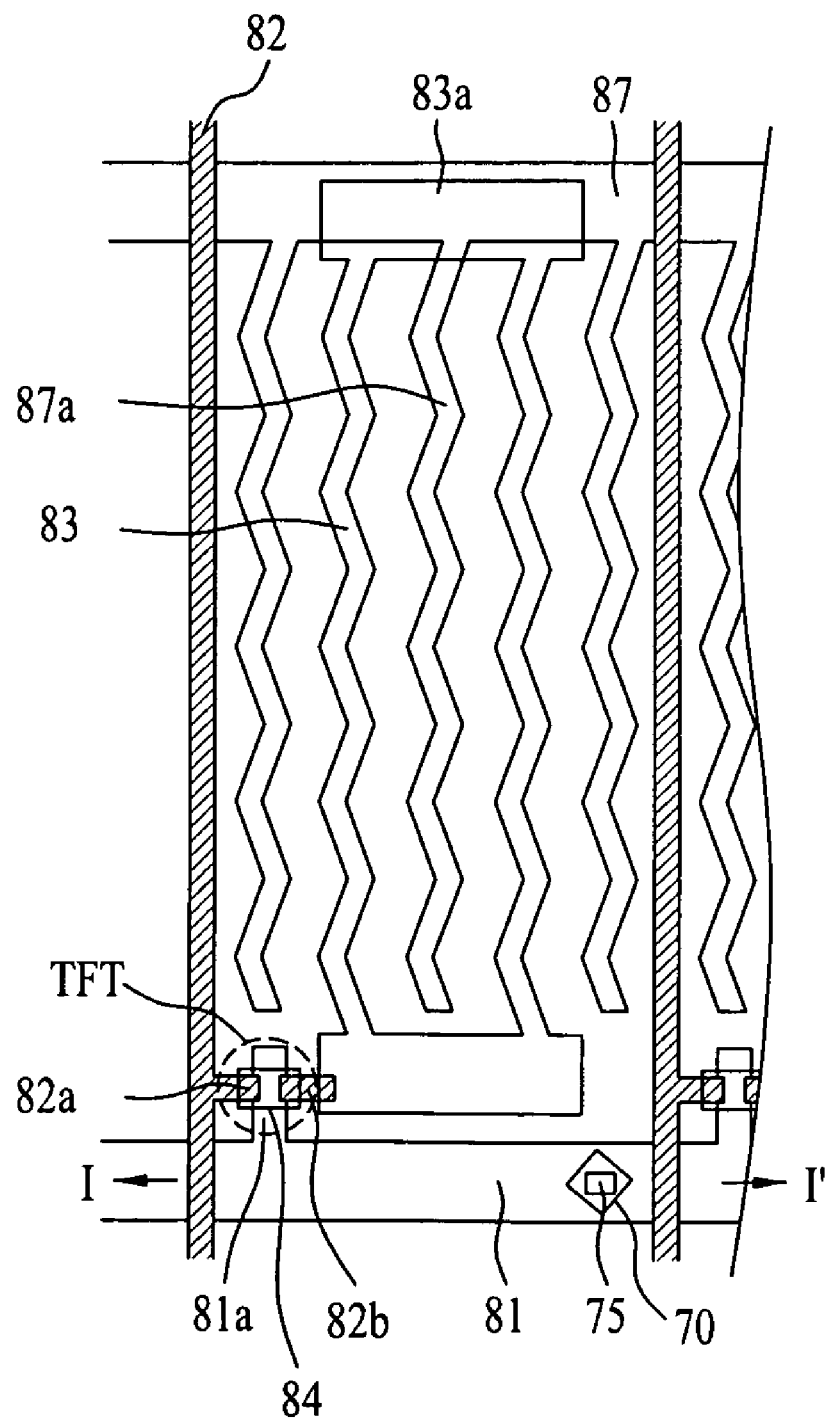
FIG. 5 is a plan view illustrating one pixel of an LCD device having an extension according to the present invention.
Figure 6:
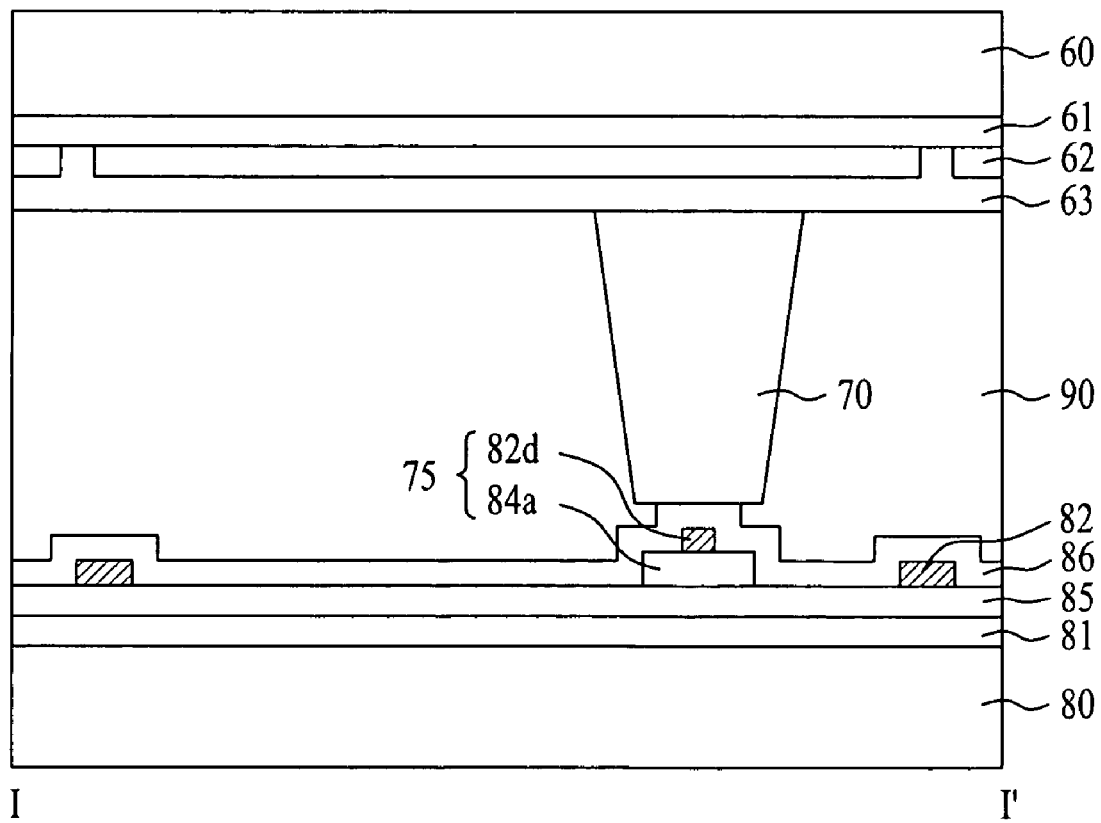
FIG. 6 is a structural sectional view taken along line I-I' of FIG. 5.

FIG. 5 is a plan view illustrating one pixel of an LCD device having an extension according to the present invention, and FIG. 6 is a structural sectional view taken along line I-I' of FIG. 5.

As shown in FIG. 5 and FIG. 6, the LCD device having an extension includes first and second substrates 60 and 80 bonded to each other at a certain space, a liquid crystal layer 90 injected between the first substrate 60 and the second substrate 80, a column spacer 70 formed on the first substrate 60, and an extension 75 formed on the second substrate 80 to correspond to the column spacer 70.

In more detail, the first substrate 60 includes a black matrix layer 61 shielding light from portions (regions for gate and data lines and TFT) except for a pixel region, an R/G/B color filter layer 62 formed to correspond to the pixel region, thereby displaying colors, and an overcoat layer 63 formed on an entire surface of the black matrix layer 61 and the color filter layer 62.

The second substrate 80 includes a plurality of gate lines 81 vertically crossing a plurality of data lines 82 to define pixel regions, pixel and common electrodes 83 and 87a alternately formed in each pixel region where the gate lines 81 cross the data lines 82, and a plurality of TFTs formed at respective areas where the gate lines 81 cross the data lines 82. The common electrode 87a is forked from common lines 87 parallel to the gate lines 81. The common and pixel electrodes 87a and 83 are formed substantially parallel to each other in a zigzag pattern.

The process of fabricating the above elements on the second substrate will be described as follows.

A metal material such as Mo, Al and Cr is deposited on the second substrate 80 by sputtering and then patterned using a mask (not shown) to form a plurality of gate lines 81 and a gate electrode 81a extended from the gate lines. The common lines 87 are formed in parallel to the gate lines 81, and the common electrodes 87a forked from the common lines 87 are formed within the pixel region. The common electrodes 87a are formed in a zigzag pattern.

Subsequently, an insulating material such as SiNx is deposited on the second substrate 80 including the gate lines 81 to form a gate insulating layer 85.

A semiconductor layer 84 is formed on the gate insulating layer 85 on the gate electrode 81a. The semiconductor layer 84 is formed in such a manner that an amorphous silicon layer and an n+ layer heavily doped with P are sequentially deposited on the gate insulating layer 85 and then patterned using a mask (not shown). The semiconductor layer 84 selectively remains at a predetermined width in a predetermined portion on the gate line 81 to form a semiconductor layer pattern 84a.

Afterwards, a metal material such as Mo, Al and Cr is deposited on the entire surface by sputtering and then patterned using a mask (not shown) to form data lines 82 and source and drain electrode 82a and 82b at both sides of the gate electrode 81a. The source electrode 82a is extended from the data line 82. The n+ layer below the source and drain electrodes 82a and 82b is overetched. Thus, the n+ layer is removed from the gate electrode 81a. In this case, the amorphous silicon layer is exposed from the gate electrode 81a, and the exposed portion is defined as a channel region of the TFT. The semiconductor layer 84 is comprised of the amorphous silicon layer and the n+ layer. A source and drain metal layer 82d is formed on a predetermined portion of the semiconductor layer pattern 84a at a predetermined width (preferably, smaller than the semiconductor layer pattern 84a) along with the data line 82. The extension 75 is formed by depositing the source and drain metal layer 82d and the semiconductor layer pattern 84a. Next, a passivation film 86 of SiNx is deposited on the entire surface of the gate insulating layer 85 including the semiconductor layer pattern 84a, the data line 82, the source electrode 82a and the drain electrode 82b by a chemical vapor deposition (CVD) method. An inorganic material such as SiNx is mainly used as a material of the passivation film 86. An organic material having low dielectric ratio, such as BenzoCycloButene (BCB), Spin On Glass (SOG), and acryl, may be used as a material of the passivation film 86 to improve an aperture ratio of a liquid crystal cell.

Subsequently, the passivation film 86 on the drain electrode 82b is partially etched using a mask (not shown) to form a contact hole that partially exposes the drain electrode 82b.

A transparent electrode material is deposited on the passivation film 86 by sputtering to sufficiently bury the contact hole. The transparent electrode material is then patterned using a mask (not shown) to form pixel electrodes 83 in the pixel regions. The pixel electrodes 83 alternate with the common electrodes 87a. At this time, the pixel electrodes 83 are electrically connected to the drain electrode 82b through the contact hole.

The column spacer 70 is formed on an uppermost portion (the overcoat layer 63 in the drawing) of the first substrate to correspond to the extension 75. In this case, since the column spacer 70 is in contact with an upper area of the extension 75, a frictional force is reduced when the LCD panel is touched, thereby minimizing the touch defect.

In the aforementioned LCD device having an extension, the gate line 81, the gate insulating layer 85, the semiconductor layer pattern 84a, the source and drain metal layer 82d, and the passivation film 86 are formed around the extension. A gap in the range of ±10% of a deposition thickness is formed during deposition. Therefore, if the semiconductor layer pattern 84a and the source and drain metal layer 82d are respectively formed at a thickness of 2000 Å, the extension 75 needs a thickness of about 4000 Å. However, the extension 75 may be formed over the whole LCD panel at a thickness of 3600 Å to 4400 Å due to the gap (thickness varying factor). In this way, when the extension 75 is formed, a separate pattern is further formed on the gate line 81 and two layers are further deposited and etched. Thus, unlike other portions on the gate line 81, a gap of about 800 Å additionally occurs in a portion where the extension 75 is formed. Since the passivation film, the gate insulating layer and the gate line are further formed on and below the extension 75, the total gap may be 2000 Å (=400 Å×3+800 Å) assuming that the other layers are formed at a thickness of 2000 Å.

Figure 7A:
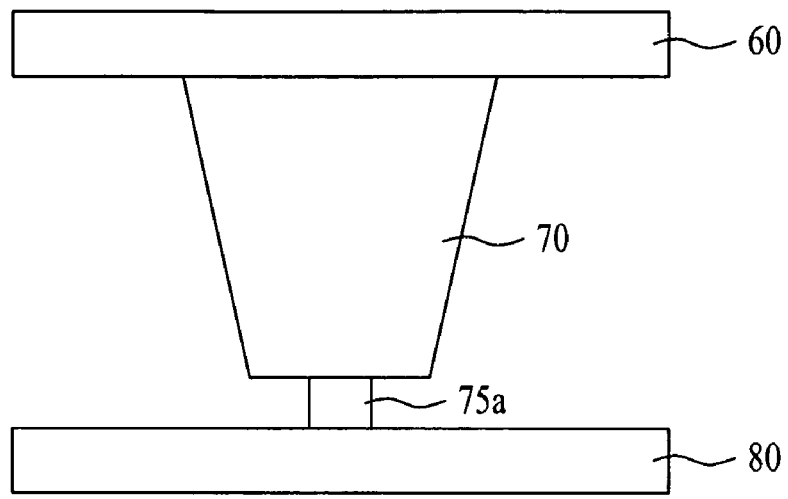
FIG. 7A and FIG. 7B are sectional views illustrating extensions and column spacers corresponding to the extensions according to the present invention.
Figure 7B:
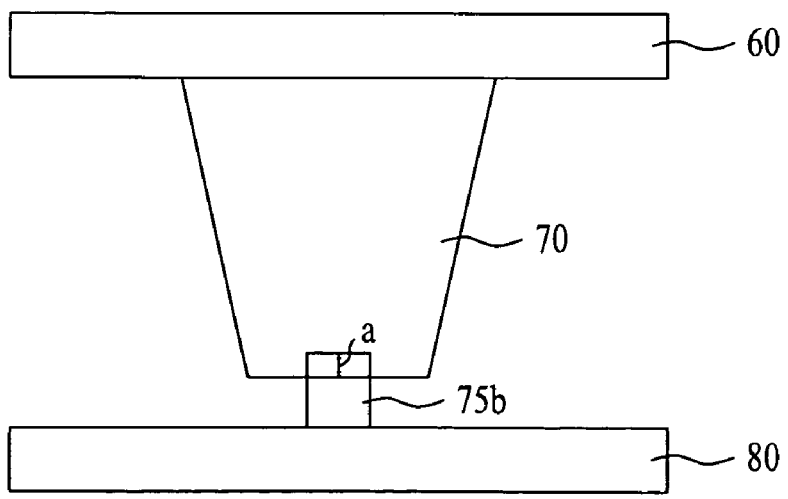

FIG. 7A and FIG. 7B are sectional views illustrating the extension and the column spacer corresponding to the extension according to the present invention.

FIG. 7A illustrates the extension 75a having no gap and the column spacer corresponding to the extension 75a. In this case, the column spacer 70 is normally in contact with the extension 75a without pressure.

As shown in FIG. 7B, if the extension 75b is formed to have a large gap, especially at a value greater than a desired value, the column spacer 70 is pressed by the extension 75b, thereby causing deformation of the column spacer in which a portion of the column spacer corresponding to the extension 75b is additionally pressed by a thickness 'a'.

Although not shown, if the extension 75b is smaller than a desired size, the extension is not in contact with the column spacer. In this case, it is difficult to prevent the touch defect from occurring.

As described above, in the extension structure using the semiconductor layer and the source and drain metal layer, the thickness varying factor of the semiconductor layer and the source and drain metal layer serves as a factor that varies a volume of the panel. Therefore, in a large sized LCD device of 30 inch or greater, the thickness varying factor serves to reduce a liquid crystal dispensing margin (in the range of a liquid crystal corresponding to a level having neither touch defect nor gravity defect).

In the aforementioned LCD device, the extension is formed on the gate line to remove the touch defect. However, it is possible to form the column spacer to correspond to the TFT without forming the extension of the gate line.

Hereinafter, in an LCD device having a 'U' shaped TFT, a structure of the column spacer corresponding to the 'U' shaped TFT will be described. In this structure, the touch defect can be removed by reducing the contact area between the column spacer and its opposing substrate.

Figure 8:
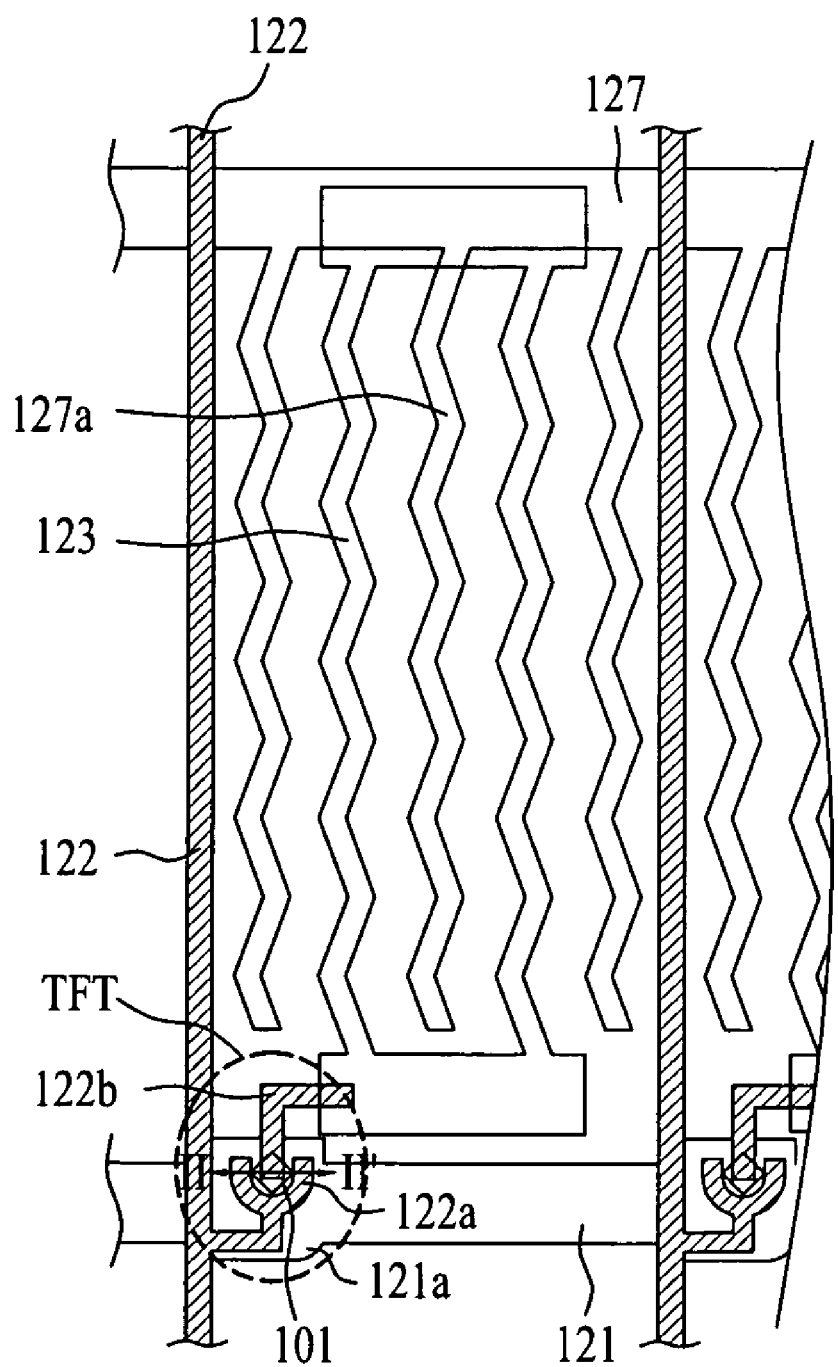
FIG. 8 is a plan view illustrating a structure of column spacers corresponding to a TFT according to the present invention.
Figure 9:
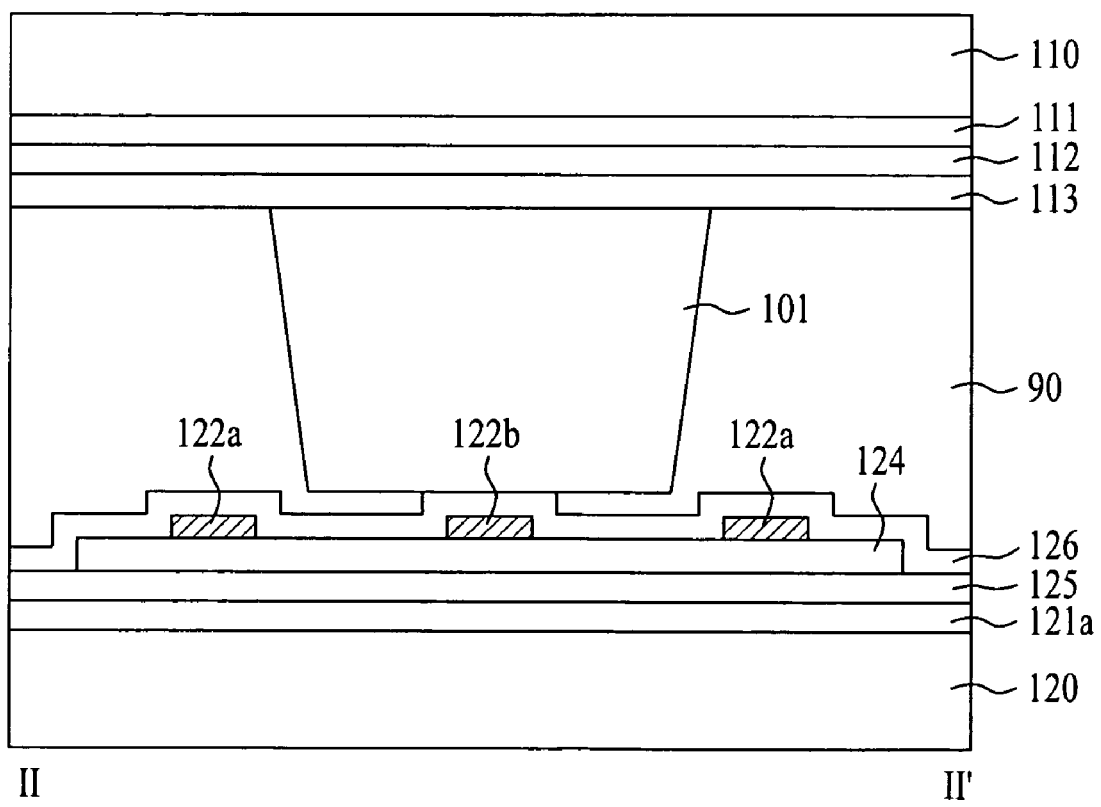
FIG. 9 is a structural sectional view taken along line II-II' of FIG. 8.

FIG. 8 is a plan view illustrating a structure of the column spacer corresponding to the TFT according to the present invention, and FIG. 9 is a structural sectional view taken along line II-II' of FIG. 8.

As shown in FIG. 8 and FIG. 9, the LCD device having the 'U' shaped TFT includes first and second substrates 110 and 120 and a liquid crystal layer 90 filled between the two substrates.

In more detail, the first substrate 110 includes a black matrix layer 111 shielding light of portions (regions for gate and data lines and TFT) except for pixel regions, an R/G/B color filter layer 112 formed to correspond to the pixel regions, thereby displaying colors, and an overcoat layer 113 formed on an entire surface of the black matrix layer 111 and the color filter layer 112.

The second substrate 120 includes a plurality of gate lines 121 vertically crossing a plurality of data lines 122 to define pixel regions, pixel and common electrodes 123 and 127a alternately formed in each pixel region where the gate lines 121 cross the data lines 122, and a plurality of TFTs formed at respective areas where the gate lines 121 cross the data lines 122. The common electrode 127a is forked from common lines 127 substantially parallel to the gate lines 121. The common and pixel electrodes 127a and 123 are formed parallel to each other in a zigzag pattern.

The TFT includes a gate electrode 121a formed in a single body with the gate line 121, a 'U' shaped source electrode 122a extended from the data line 122, a drain electrode 122b entering the 'U' shaped source electrode 122a and connected to the pixel electrode 123, and a semiconductor layer 124 covering an upper portion of the gate electrode 121a and formed in contact with lower portions of the source electrode 122a and the drain electrode 122b.

Further, a gate insulating layer 125 is interposed between the gate line 121 and the common line 127 and between the gate line 121 and the data line 122. A passivation film 126 is interposed between the data line 122 and the pixel electrode 123.

A column spacer 101 is formed on the overcoat layer 113 of the first substrate 110 to correspond to a channel region of the TFT.

In this case, the column spacer 101 is formed on the semiconductor layer 124 of the TFT to cross the 'U' shaped source electrode 122a. Since the upper portion of the drain electrode 122b is extended to the portion where the column spacer 101 is formed, the passivation film 126 on the drain electrode 122b is in contact with the column spacer 101. Therefore, the contact area between the column spacer 101 and its opposing substrate can be reduced even in case where the 'U' shaped TFT is formed, in the same manner as the extension structure.

However, in the structure in which the column spacer is formed on the TFT, the gate electrode 121a, the gate insulating layer 125, the semiconductor layer 124, the source and drain metal electrodes 122a and 122b, and the passivation film 126 are deposited on the substrate where the column spacer is actually formed in the same manner as the extension structure. For example, if each layer is formed at a thickness of about 2000 Å, a gap of a portion corresponding to the column spacer is 400 Å×5=2000 Å considering that a gap of ±10% is generated when each layer is formed. Deformation of the column spacer is varied in the portion corresponding to the column spacer depending on the serious degree of the gap, thereby causing the great difference between cell gaps in respective portions.

Therefore, an LCD device having a step difference in the substrate corresponding to the column spacer and a minimized gap in the portion corresponding to the column spacer will now be described in detail.

Figure 10:
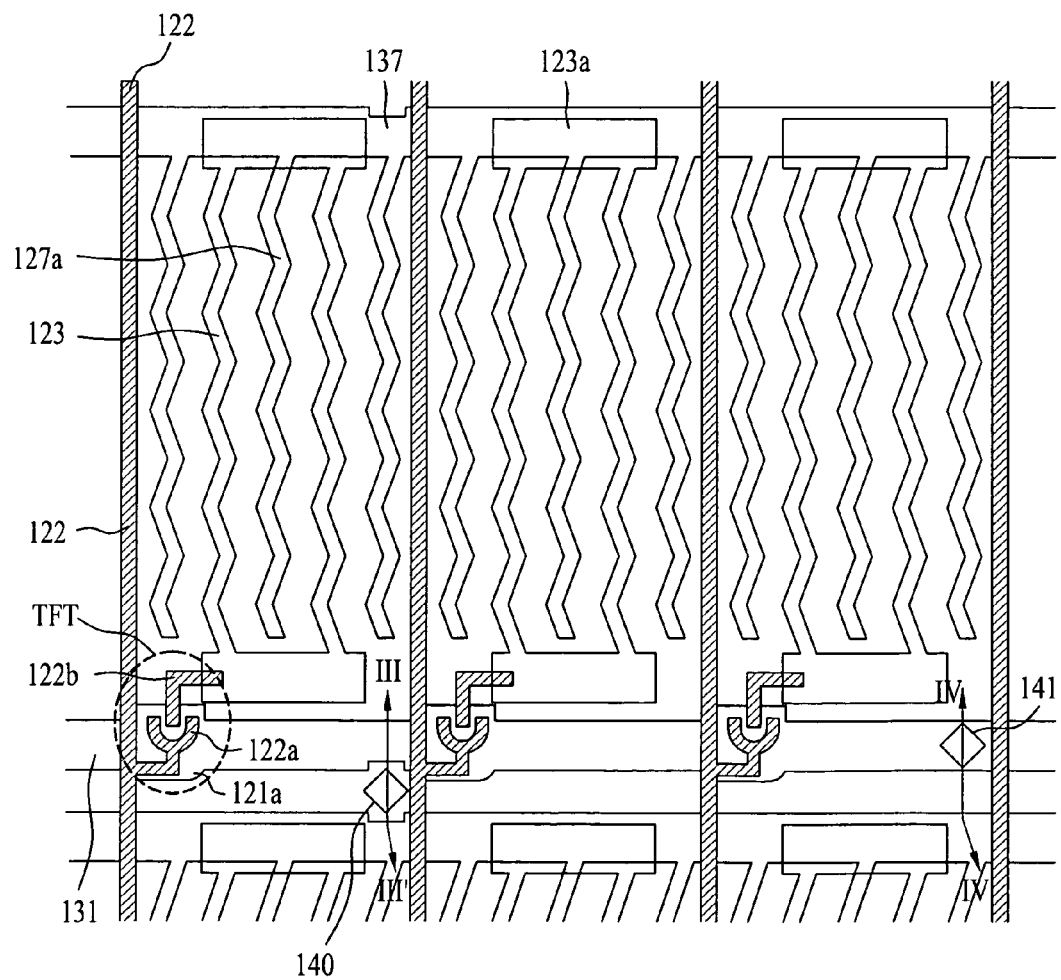
FIG. 10 is a plan view illustrating an LCD device according to the first embodiment of the present invention.
Figure 11A:
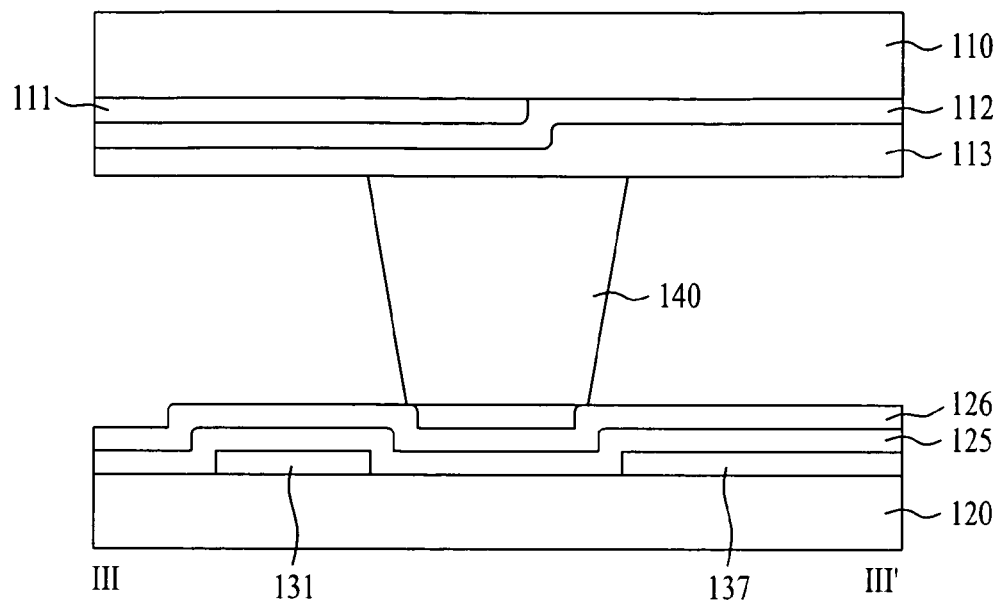
FIG. 11A is a structural sectional view taken along line III-III' of FIG. 10.
Figure 11B:
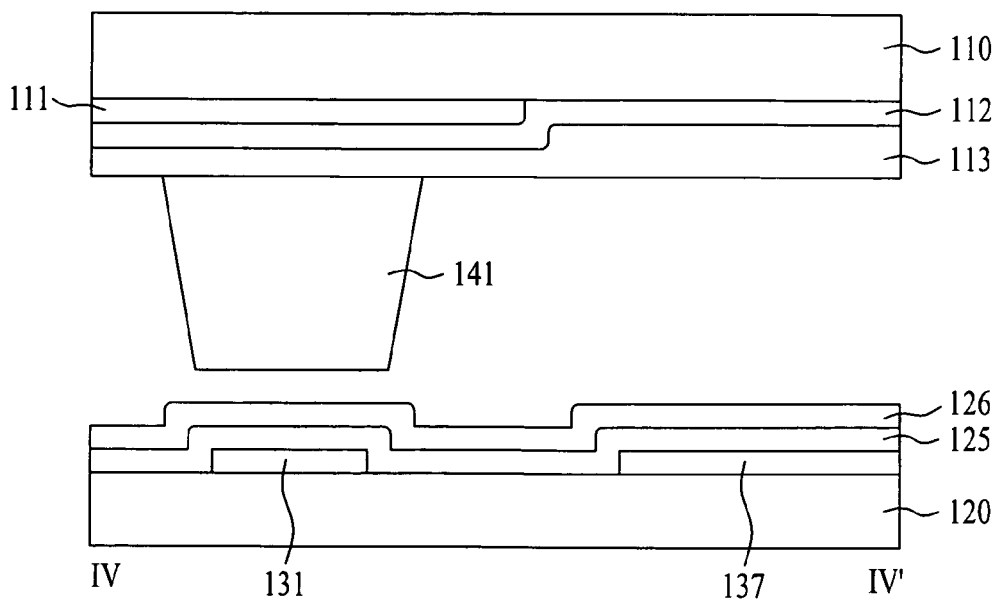
FIG. 11B is a structural sectional view taken along line IV-IV' of FIG. 10.

FIG. 10 is a plan view illustrating an LCD device according to the first embodiment of the present invention, FIG. 11A is a structural sectional view taken along line III-III' of FIG. 10, and FIG. 11B is a structural sectional view taken along line IV-IV' of FIG. 10.

As shown in FIG. 10, FIG. 11A and FIG. 11B, the LCD device according to the first embodiment of the present invention includes first and second substrates 110 and 120 facing each other and bonded to each other, and a liquid crystal layer (not shown) filled between the two substrates.

In more detail, the first substrate 110 includes a black matrix layer 111 shielding light from portions (regions for gate and data lines and TFT) except for pixel regions, an R/G/B color filter layer 112 formed to correspond to the pixel regions, thereby displaying colors, and an overcoat layer 113 formed on an entire surface of the black matrix layer 111 and the color filter layer 112.

The second substrate 120 includes a plurality of gate lines 131 vertically crossing a plurality of data lines 122 to define pixel regions, pixel and common electrodes 123 and 127a formed in each pixel region substantially parallel with each other, and a plurality of 'U' shaped TFTs formed at respective areas where the gate lines 131 cross the data lines 122. The common electrode 127a is forked from common lines 137 parallel to the gate lines 131. The common and pixel electrodes 127a and 123 are formed substantially parallel to each other in a zigzag pattern.

Each of the TFTs includes a gate electrode 121a formed in a single body with the gate line 131, a 'U' shaped source electrode 122a extended from the data line 122, a drain electrode 122b entering the 'U' shaped source electrode 122a and connected to the pixel electrode 123, and a semiconductor layer (not shown) covering an upper portion of the gate electrode 121a and formed in contact with lower portions of the source electrode 122a and the drain electrode 122b.

Further, a gate insulating layer 125 is interposed between the gate line 131 and the common line 137 and between the gate line 131 and the data line 122. A passivation film 126 is interposed between the data line 122 and the pixel electrode 123.

In the LCD device according to the first embodiment of the present invention, a first column spacer 140 is formed on the overcoat layer 113 of the first substrate 110 to correspond to a portion between the gate line 131 and the common line 137. In other words, the common line 137 and the gate line corresponding to the portion where the first column spacer 140 is formed have a width smaller than those of other portions, so that the first column spacer is not overlapped with the common line 137 and the gate line 131.

In this case, as shown in FIG. 11A, the first column spacer 140 is in contact with the passivation film 126 formed with a step difference between the gate line 131 and the common line 137. The first column spacer 140 forms a cell gap between the first and second substrates 110 and 120 and has a small contact area with its opposing substrate, i.e., the passivation film 126 formed on the uppermost of the second substrate 120. In other words, a portion where the metal line (gate line or common line) is not formed serves as a recessed portion between the gate line 131 and the common line 137. Therefore, the gate insulating layer 125 and the passivation film 126 formed on the gate line 131 and the common line 137 are formed with a step difference due to the recessed portion corresponding to the portion between the gate line 131 and the common line 136. The first column spacer 140 is formed to correspond to the recessed portion and around the recessed portion. The upper portion of the first column spacer 140 corresponding to the recessed portion is not contacted to the passivation film 126. Therefore, the small contact area is formed between the first column spacer 140 and the passivation film 126.

A size of the contact area between the first column spacer 140 and the passivation film 126 is varied depending on the interval between the gate line 131 and the common line 137 or the retracted range of the gate line 131 or the common line 137 at the portion where the column spacer 140 is formed. At this time, the interval between the gate line 131 and the common line 137 is in the range of about 10 μm to 16 μm based on resolution of an exposing unit. The first column spacer 140 is formed between the gate line 131 and the common line 137 over the interval of about 10 μm to 16 μm. The interval between the gate line 131 and the common line 137 may be narrowed in the range of about 8 μm if resolution of the exposing unit becomes great.

Furthermore, as shown in FIG. 11B, a second column spacer 141 is formed on the overcoat layer 113 of the first substrate 110 to correspond to a predetermined portion of the gate line 131. The second column spacer 141 has a height smaller than that of the first column spacer 140 by about 0.2 μm to 0.6 μm. The second column spacer is spaced apart from the passivation film 126 corresponding to the uppermost of the opposing substrate 120 at a predetermined interval to prevent the touch defect of the column space from occurring.

In this case, the first column spacer 140 is formed per three pixels (subpixel) at a sectional size of 14 μm×14 μm (preferably, 10 µm to 30 µm×10 µm to 30 µm) around the first substrate 110. Also, the second column spacer 141 is formed per three pixels at a sectional size of 14 µm×14 µm (preferably, 10 µm to 30 µm×10 µm to 30 µm) around the first substrate 110.

The first and second column spacers 140 and 141 are formed on the uppermost surface of the first substrate 110, i.e., the overcoat layer 113. The lower surfaces of the column spacers may be formed in various polygonal shapes, for example, polygonal columns having a certain height. The lower surfaces of the column spacers may have a cylinder shape. Also, they may have a square column shape as shown. The sizes of the first and second column spacers 140 and 141 may be varied depending on the size of the LCD panel. The sizes of the first and second column spacers 140 and 141 may be varied depending on line widths of the gate line 131 and the common line 137 and a line width of a space between the gate line 131 and the common line 137. The retracted range of the gate line 131 and the common line 137 corresponding to the first column spacer 140 depends on the size of the first column spacer 140. In this case, the retracted portion of the gate line 131 or the common line 137 has the line width in the range that resistance of the gate line 131 or the common line 137 does not become great. In other words, even if the gate line 131 or the common line 137 is partially retracted, the line width should be obtained in the range that response speed is not deteriorated when the LCD device is driven.

The first and second column spacers 140 and 141 are formed under the same process condition. The first and second column spacers 140 and 141 have different exposing amounts per portion to form different heights from each other. For example, if the first and second column spacers 140 and 141 are formed of a negative photo-hardening resin, a first mask is arranged on the first substrate 110 to perform an exposure process, wherein the first mask includes a transparent portion defined to correspond to the first column spacer 140 and a semitransparent portion defined to correspond to the second column spacer 141. If the first and second column spacers 140 and 141 are formed of a positive photo-hardening resin, a second mask opposite to the first mask is used.

The first and second column spacers 140 and 141 are formed to correspond to the step difference formed on the second substrate 120. The step difference is formed between the gate line 131 and the common line 137. Therefore, the gate line 131 or the common line 137, the gate insulating layer 125, and the passivation film 126 are formed on the second substrate 120 corresponding to the first and second column spacers 140 and 141. In this case, since two layers are not formed in comparison with the structure in which the column spacer is formed to correspond to the TFT, imbalance of the step difference generated in each portion can be reduced.

In the LCD device of the present invention, for example, if the semiconductor layer (not shown) and the data line 122 are respectively formed at a thickness of about 2000 Å, a gap of each portion is in the range of ±10% of a deposition thickness. In this case, it is possible to reduce a gap corresponding to a thickness of 2×400 Å=800 Å in comparison with the deposition structure of the semiconductor layer and the data line in which the column spacer is formed to correspond to the extension or the TFT.

Meanwhile, although the LCD device shown in FIG. 10 has a 'U' shape, the LCD device of the present invention may have various shapes without being limited to the 'U' shape.

Hereinafter, a method for fabricating the LCD device having the TFT will be described.

A metal material such as Mo, Al and Cr is deposited on the second substrate 120 by sputtering and then patterned using a mask (not shown) to form the plurality of gate lines 131 and the gate electrodes 121a extended from the gate lines 131. The common lines 137 are formed in parallel with the gate lines 131. The common electrodes 127a forked from the common lines 137 are formed in the pixel regions in a zigzag arrangement. A predetermined portion where the gate lines 131 face the common lines 137 may be retracted (at a thinner line width).

Subsequently, an insulating material of SiNx is deposited on the second substrate 120 including the gate lines 131 to form the gate insulating layer 125.

The semiconductor layer 124 is formed on the gate insulating layer 125 to cover the gate electrode 121a. The semiconductor layer 124 is formed in such a manner that an amorphous silicon layer and an n+ layer heavily doped with P are sequentially deposited on the gate insulating layer 125 and then patterned using a mask (not shown).

Afterwards, a metal material such as Mo, Al and Cr is deposited on the entire surface by sputtering and then patterned using a mask (not shown) to form the data lines 122 and the source and drain electrodes 122a and 122b at both sides of the gate electrode 121a. The source electrode 122a is extended from the data line 122. At this time, the n+ layer below the source and drain electrodes 122a and 122b is overetched. Thus, the n+ layer is removed from the gate electrode 121a. In this case, the amorphous silicon layer is exposed from the gate electrode 121a, and the exposed portion is defined as a channel region of the TFT. The semiconductor layer 124 is comprised of the amorphous silicon layer and the n+ layer.

Next, the passivation film 126 of SiNx is deposited on the gate insulating layer 125 including the semiconductor layer 124, the data line 122, the source electrode 122a and the drain electrode 122b by a chemical vapor deposition (CVD) method. An inorganic material such as SiNx is mainly used as a material of the passivation film 126. Recently, an organic material having low dielectric ratio, such as BenzoCycloButene (BCB), Spin On Glass (SOG), and acryl, is used as a material of the passivation film 126 to improve an aperture ratio of a liquid crystal cell.

Subsequently, the passivation film 126 on the drain electrode 122b is partially etched using a mask (not shown) to form a contact hole that partially exposes the drain electrode 122b.

A transparent electrode material is deposited on the passivation film 126 by sputtering to sufficiently bury the contact hole. The transparent electrode material is then patterned using a mask (not shown) to form the pixel electrodes 123 in the pixel regions. The pixel electrodes 123 alternate with the common electrodes 127a. At this time, the pixel electrodes 123 are electrically connected with the drain electrode 122b through the contact hole.

The black matrix layer 111 is formed on the first substrate 110 to correspond to portions (gate lines, data lines and TFT) where the pixel regions are not formed. The color filter layer 112 is formed to correspond to the pixel regions, and the overcoat layer 113 is formed on the entire surface of the first substrate 110 including the black matrix layer 111 and the color filter layer 112.

A photo-hardening resin is deposited on the entire surface of the overcoat layer 113 and then selectively removed to form the first column spacer 140 of the first height corresponding to the portion between the gate line 131 and the common line 137 of the second substrate 120 and the second column spacer 141 of the second height corresponding to the predetermined portion of the gate line 131.

In this case, the first height is higher than the second height by about 0.2 μm to 0.6 μm. This height difference may be generated by varying the exposing amount using each portion of a first mask, which defines the first and second column spacers 140 and 141, as a transparent portion and a semitransparent portion. In this case, the photo-hardening resin is a negative photo-hardening resin. If the first and second common spacers 140 and 141 are of a positive photo-hardening resin, a second mask opposite to the first mask is used.

In case where the first column spacer 140 is formed as above, the contact area between the first column spacer 140 and the second substrate 120 can be reduced to prevent the touch defect from occurring and a cell gap between the first and second substrates 110 and 120 can be maintained.

Also, in case where the second column spacer 141 is formed as above, a gap between the second substrate and the column spacer is obtained so as to obtain a margin, thereby failing to cause deformation of the column spacer when the column spacer is pressurized during bonding of the column spacer to the second substrate 120.

Meanwhile, an alignment layer may further be formed on the uppermost surfaces of the first and second substrates 110 and 120.

Figure 12:
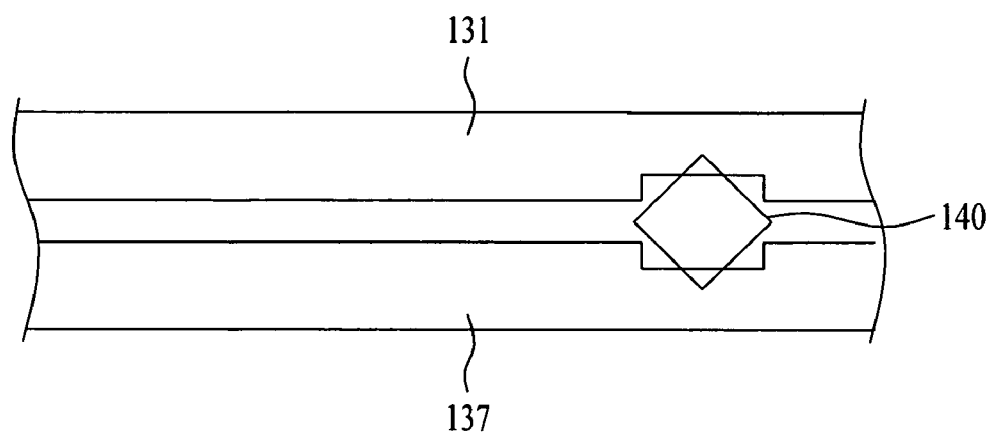
FIG. 12 is a plan view illustrating a first column spacer of an LCD device according to the second embodiment of the present invention.

FIG. 12 is a plan view illustrating a first column spacer of an LCD device according to the second embodiment of the present invention.

As shown in FIG. 12, the first column spacer 140 of the LCD device according to the second embodiment of the present invention is arranged between the gate line 131 and the common line 137, which are more adjacent to each other than those of the first embodiment. The column spacer 140 is overlapped with the upper portion on the gate and common lines. In this case, to maintain the contact area between the second substrate 120 and the first column spacer 140 similarly to the first embodiment, the line width can be reduced so that the gate line 131 and the common line 137 below the first column spacer 140 can be more retracted.

Figure 13:
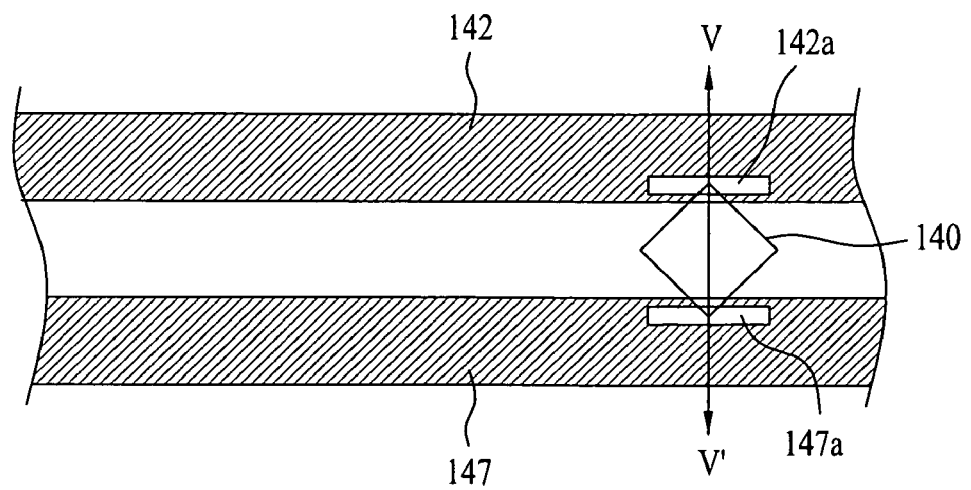
FIG. 13 is a plan view illustrating a first column spacer of an LCD device according to the third embodiment of the present invention.
Figure 15:
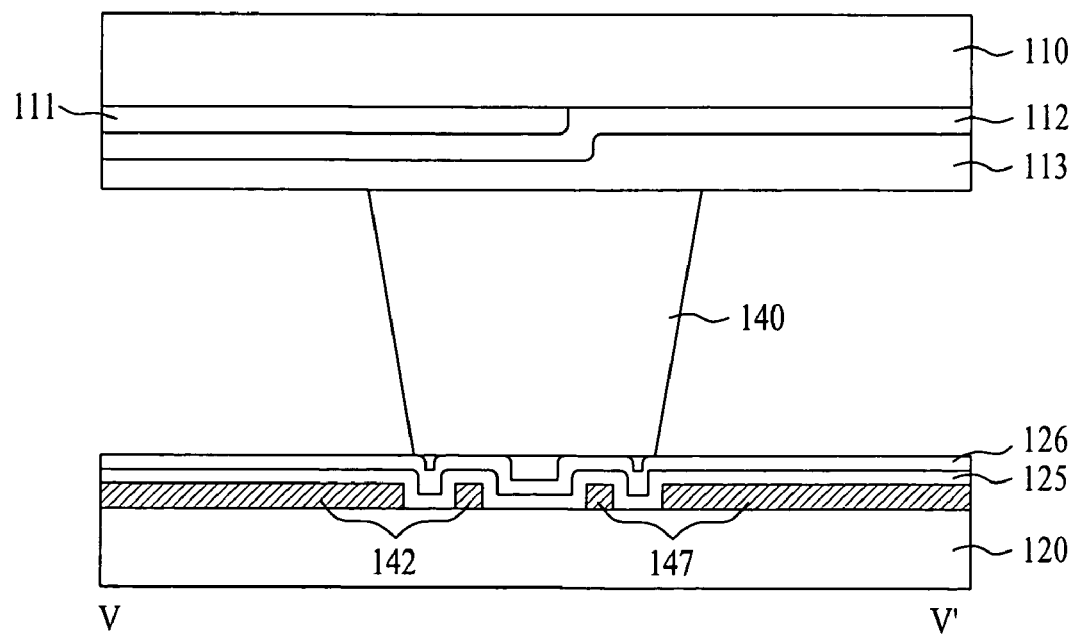
FIG. 15 is a structural sectional view taken along line V-V' of FIG. 13.

FIG. 13 is a plan view illustrating a first column spacer of an LCD device according to the third embodiment of the present invention, and FIG. 15 is a structural sectional view taken along line V-V' of FIG. 13.

As shown in FIG. 13 and FIG. 15, in the LCD device according to the third embodiment of the present invention, a gate line 142 and a common line 147 are formed on a second substrate in parallel with each other. The gate line 142 and the common line 147 are respectively provided with a gate slit 142a and a common slit 147a to face each other. The first column spacer 140 is formed on the first substrate between the gate slit 142a and the common slit 147a.

At this time, the first column spacer 140 is formed on the line V-V' of FIG. 13. That is, the first column spacer 140 is formed over the gate line 142, the gate slit 142a, the gate line, the common line 147, and the common slit 147a and the common line 147. The first column spacer 140 may be extended to the gate slit 142a and the common slit 147a to overlap these slits. If the column spacer 140 is arranged as above, the gate insulating layer 125 and the passivation film 126 are formed on the second substrate to have a recessed portion. Therefore, the contact area between the first column spacer 140 and the passivation film 126 is actually reduced.

Figure 14:
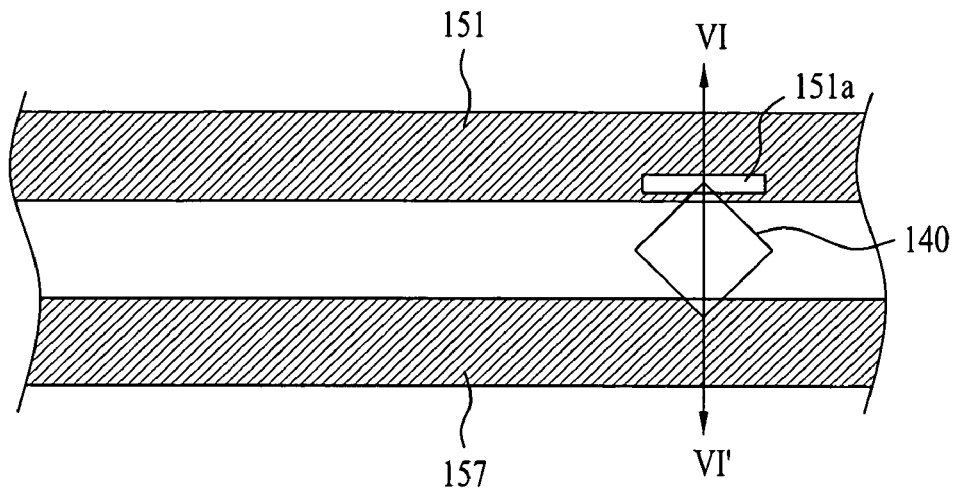
FIG. 14 is a plan view illustrating a first column spacer of an LCD device according to the fourth embodiment of the present invention.
Figure 16:
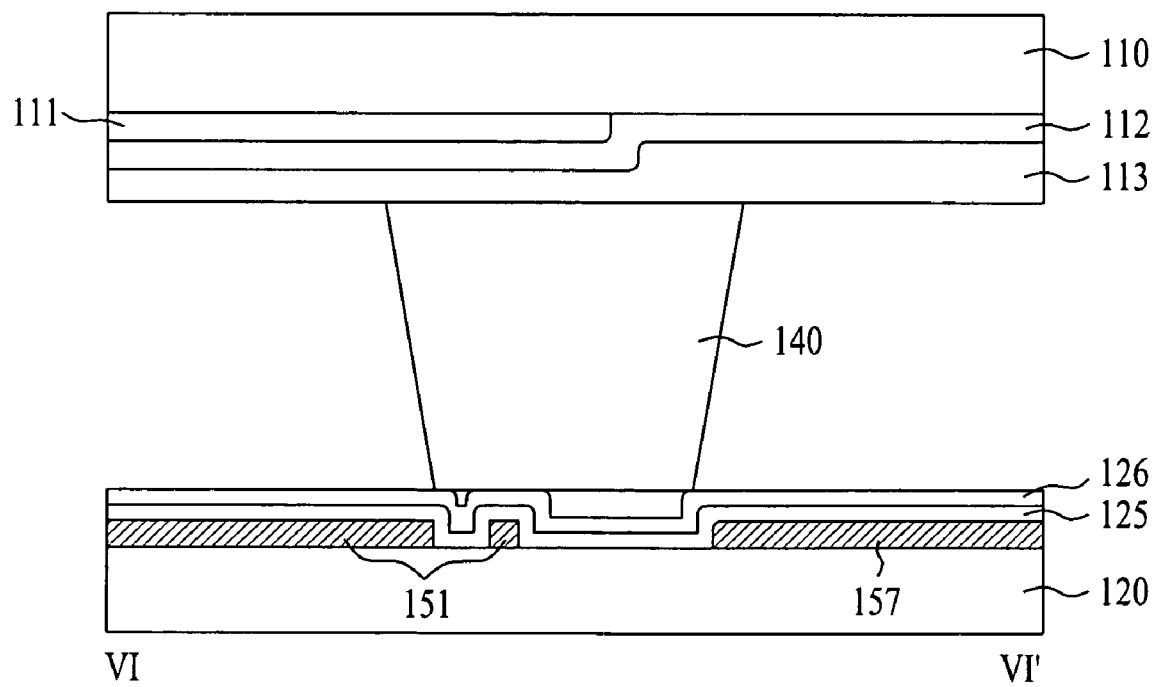
FIG. 16 is a structural sectional view taken along line VI-VI' of FIG. 14.

FIG. 14 is a plan view illustrating a first column spacer of an LCD device according to the fourth embodiment of the present invention, and FIG. 16 is a structural sectional view taken along line VI-VI' of FIG. 14.

In the LCD device according to the fourth embodiment of the present invention, a slit of one line is removed from the structure of the third embodiment. As shown in FIG. 14, only a gate slit 151a may be provided. Also, only a common slit may be provided. It is important that the first column spacer 140 is arranged to pass through the slit.

In the LCD device according to the fourth embodiment of the present invention, the first column spacer 140 is formed over a predetermined portion of the gate slit 151a and the common line 157 in a structure in which the gate slit 151a is formed at the gate line 151. The gate line 151 and the common line 157 are formed substantially parallel with each other and face each other.

At this time, the first column spacer 140 is formed on the line VI-VI' of FIG. 14. That is, the first column spacer 140 is formed over the gate line 151, the gate slit 151a, the gate line, and the common line 157. As an example, the first column spacer 140 may be extended to the predetermined portion of the common line 151 and the gate slit 151a to overlap them. If the column spacer 140 is arranged as above, the gate insulating layer 125 and the passivation film 126 have a recessed portion at a portion adjacent to the first column spacer 140. Therefore, the contact area between the first column spacer 140 and the passivation film 126 is actually reduced.

In the LCD device according to the fourth embodiment of the present invention, the cell gap is maintained through the first column spacer and the touch defect can be avoided. Also, at least one slit is provided on at least one of the gate line and the common line corresponding to the first column spacer so that the first column spacer is formed to correspond to the step difference defined by the recessed portion formed by the slit. Thus, the gap is remarkably reduced by about 800 Å in comparison with the structure in which the column spacer is formed to correspond to the extension or the TFT. As a result, it is possible to improve the touch defect and maintain a stable cell gap.

Furthermore, when the LCD panel is pressurized by the second column spacer, a certain margin is obtained to remarkably reduce deformation of the column spacer. This could lead to a stable cell gap.

Figure 17:
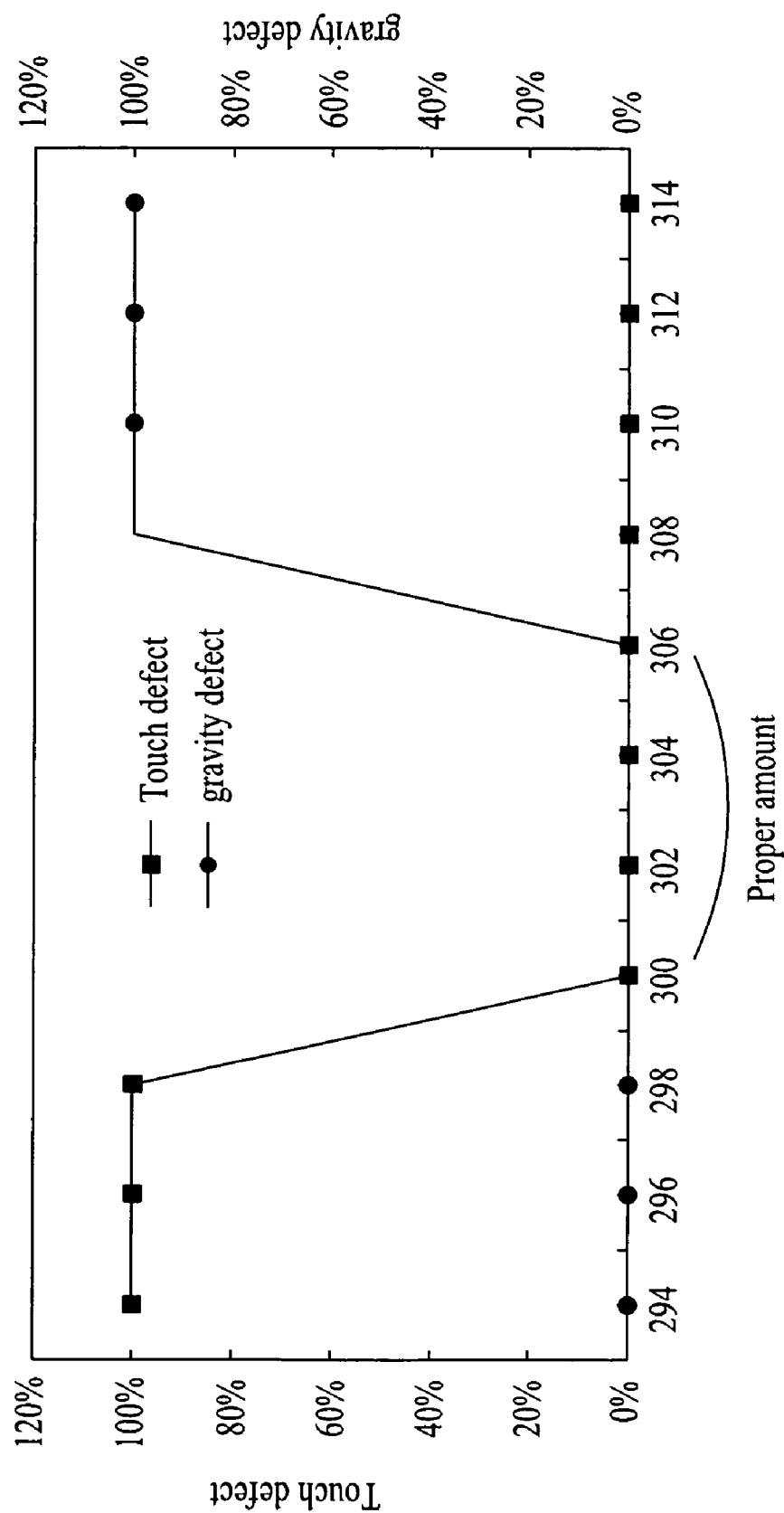
FIG. 17 is a graph illustrating a liquid crystal dispensing margin in a structure of an LCD device according to the present invention.

FIG. 17 is a graph illustrating a liquid crystal dispensing margin in the structure of the LCD device according to the present invention.

FIG. 17 illustrates a result obtained by applying the LCD device of the present invention to a 37' LCD model. A proper liquid crystal dispensing amount that can remove the touch defect and the gravity defect is in the range of 300 dot to 306 dot. In other words, 6 dot corresponds to the normal range having neither touch defect nor gravity defect. If the liquid crystal is dispensed on the LCD panel in a range smaller than 300 dot, a large touch defect occurs. If the liquid crystal is dispensed on the LCD panel in a range greater than 306 dot, a large gravity defect occurs. In the structure in which the column spacer is formed to correspond to the extension or the TFT, the proper dispensing amount is in a range of about 0 dot to 3 dot as the touch defect is biased to the right on the graph and the gravity defect is biased to the left on the graph. In this way, since the proper dispensing amount has an increased range, it is possible to obtain a stable cell gap and remove the defect.

As described above, the LCD device according to the present invention has the following advantages.

First, since the first column spacer is arranged on the line passing through or between the gate and common lines, it is in contact with the opposing substrate to correspond to the recess defined on the above line, thereby reducing the contact area between the column spacer and the substrate and thus preventing the touch defect from occurring.

Second, the slit of either the portion between the gate line and the common line or the predetermined line is provided on the line from the gate line to the common line so that the first column spacer is formed to correspond to the step difference defined by the recessed portion formed by the slit. Thus, the gap is remarkably reduced by about 800 Å (obtained assuming that the source and drain metal layer and the semiconductor layer have a thickness of about 2000 Å) in comparison with the structure in which the column spacer is formed to correspond to the extension or the TFT. As a result, it is possible to remove the touch defect and maintain a stable cell gap over the whole LCD panel.

Third, when the LCD panel is pressurized by the second column spacer, a certain margin is obtained to remarkably reduce deformation of the column spacer. This could lead to a stable cell gap.

Finally, the reduction of the gap and the stable cell gap obtained by reducing deformation of the column spacer serve to improve the liquid crystal dispensing margin.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for manufacturing an LCD device, comprising:
    providing a first substrate and a second substrate;
    forming gate lines, common lines parallel to the gate lines, at least one common electrode being extended from the common lines on the first substrate, wherein each common line is spaced apart from each gate line at an interval of about 8 µm to 16 µm and each of the gate line has at least one slit;
    forming data lines and TFTs on the first substrate, the data lines crossing the gate lines and defining pixel regions;
    forming at least one pixel electrode in each of the pixel regions, the at least one pixel electrode connected to a drain electrode of the thin film transistor;
    forming a plurality of first column spacers on the second substrate, wherein the center of each first column spacer overlaps with a recessed portion between the gate lines and the common lines, and wherein edges of each first column spacers overlapped with the at least one slit in the common line and the gate lines;
    dispensing liquid crystal on one of the first and second substrates; and
    bonding the first and second substrates.

2. The method according to claim 1, wherein one portion of the first column spacers corresponding to at least one of the common lines or the gate lines has a width smaller than other portions corresponding to the recessed portion between the gate lines and the common lines.

3. The method according to claim 1, further comprising:
    forming a plurality of second column spacers on the second substrate corresponding to the gate lines.

4. The method according to claim 1, wherein the second column spacer is not in contact with the first substrate.

5. The method according to claim 1, wherein the second column spacer is spaced apart from the uppermost surface of the first substrate at an interval of about 0.2 µm to about 0.6 µm when the first substrate is bonded to the second substrate.

6. The method according to claim 1, further comprising:
    forming a black matrix layer on the second substrate to shield portions except for pixel regions.

7. The method according to claim 6, further comprising:
    forming an overcoat layer on an entire surface of the second substrate including the black matrix layer.

8. The method according to claim 5, wherein the gate lines and common lines are on a same layer.

9. The method according to claim 8, further comprising:
    forming a gate insulating layer on a layer of the gate lines, common lines and common electrodes.

10. The method according to claim 9, further comprising forming a passivation film on the gate insulating layer including the data lines.

11. The method according to claim 1, wherein the at least one common electrode and at least one pixel electrode are alternately positioned.

12. The method according to claim 1, wherein the first column spacer is formed one per three pixels of the LCD Device.

* * * * *